S. B. AUSTIN.
ACCUMULATOR FOR ADDING MACHINES.
APPLICATION FILED FEB. 15, 1910. RENEWED MAY 27, 1913.

1,071,382.

Patented Aug. 26, 1913.
4 SHEETS—SHEET 1.

Attest:
Ben M. Stahl
Ewd L. Tolson

Inventor.
Sydney B. Austin,
by Spear, Middleton, Donaldson & Spear
Attys.

S. B. AUSTIN.
ACCUMULATOR FOR ADDING MACHINES.
APPLICATION FILED FEB. 15, 1910. RENEWED MAY 27, 1913.

1,071,382.

Patented Aug. 26, 1913.

4 SHEETS—SHEET

Attest:
Bent. M. Stahl.
Ewd L. Tolson.

Inventor:
Sydney B. Austin.
By Spear, Middleton, Donaldson & Spear
Attys

S. B. AUSTIN.
ACCUMULATOR FOR ADDING MACHINES.
APPLICATION FILED FEB. 15, 1910. RENEWED MAY 27, 1913.

1,071,382.

Patented Aug. 26, 1913.
4 SHEETS—SHEET 4.

Attest:
Gwd L. Tolson.
Chas. J. Calhoun.

Inventor:
Sydney B. Austin,
by Spear, Middleton, Donaldson & Spear
Attys.

UNITED STATES PATENT OFFICE.

SYDNEY B. AUSTIN, OF PIKESVILLE, MARYLAND, ASSIGNOR, BY MESNE ASSIGNMENTS, TO AUSTIN ADDING MACHINE CORPORATION, OF DELAWARE.

ACCUMULATOR FOR ADDING-MACHINES.

1,071,382.    Specification of Letters Patent.    Patented Aug. 26, 1913.

Original application filed January 14, 1909, Serial No. 472,387. Divided and this application filed February 15, 1910, Serial No. 544,142. Renewed May 27, 1913. Serial No. 770,278.

*To all whom it may concern:*

Be it known that I, SYDNEY B. AUSTIN, a citizen of the United States, residing at Pikesville, Maryland, have invented certain new and useful Improvements in Accumulators for Adding-Machines, of which the following is a specification.

My invention relates to accumulator mechanisms for adding machines, and is an improvement on that type disclosed in Letters Patent of the United States granted to G. W. and A. L. Dudley Nov. 4, 1902, #712777.

Figure 1:
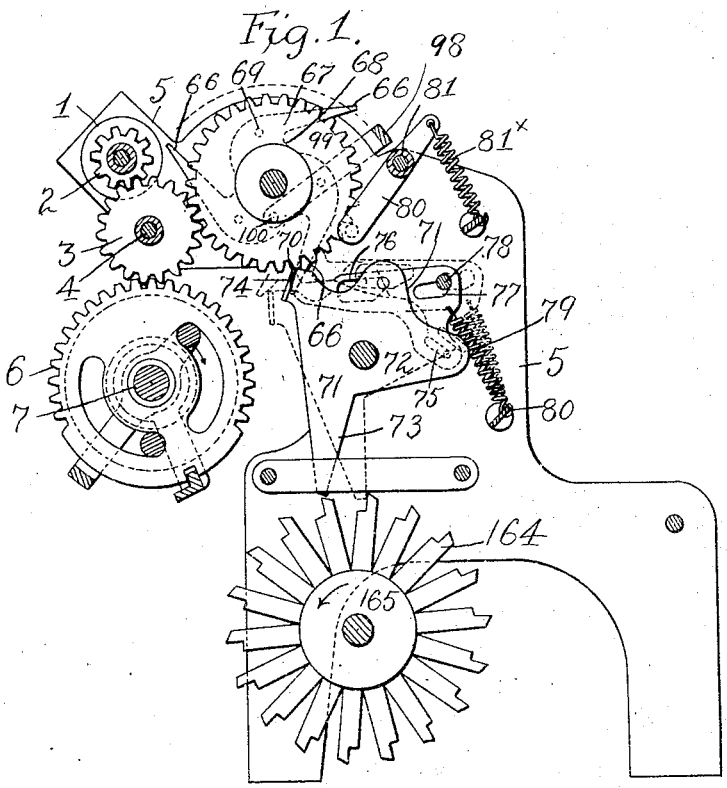
Figure 2:
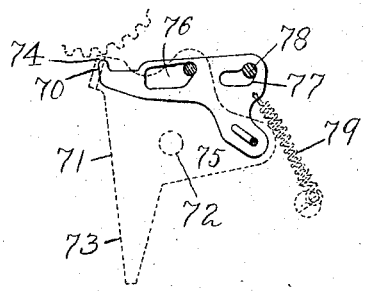
Figure 3:
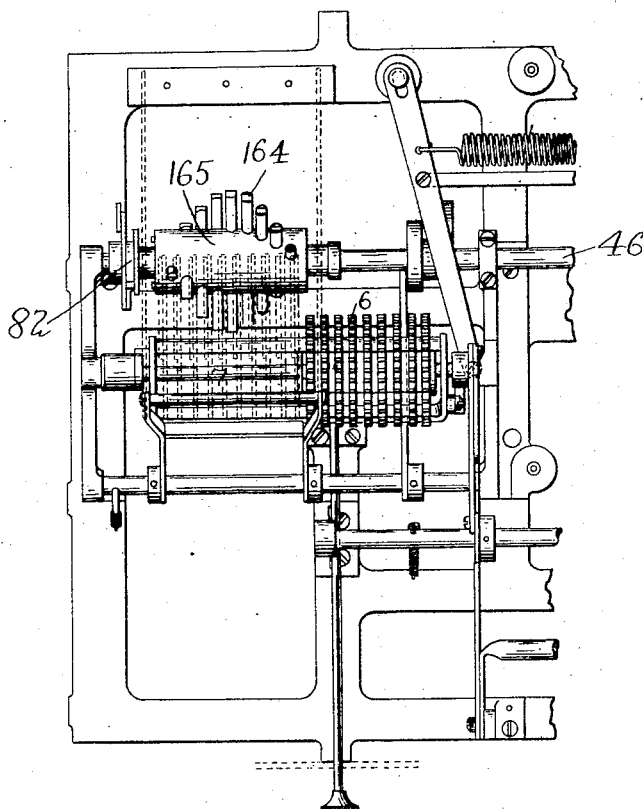
Figure 4:
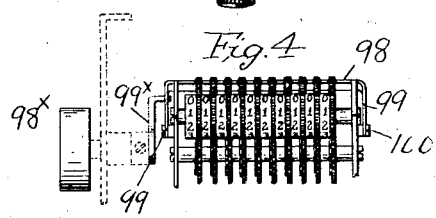

The accompanying drawing shows in Figure 1 a vertical sectional view through the accumulator mechanism. Fig. 2 is a detailed view. Fig. 3 is a plan view with the number disk omitted. Fig. 4 is a detail view. Figs. 5 to 8 show the mechanism at different stages of its operation. Figs. 9, 10, 11 and 12 are views of the parts in their different positions.

1 indicates the number wheels or adding disks, each of which has a gear 2 which mesh with transmitting gears 3 on a shaft 4 supported in the frame 5 of the accumulator mechanism. These transmitting gears are engaged by toothed selectors 6, which as a group are located to one side of the transmitting gears and disengaged therefrom when the machine is in normal condition ready for operation by pressing the keys.

The selectors are on a shaft 7 and as a group they are adapted to move axially into engagement with the transmitting gears and are then turned to set up the number on the registering or number wheels. The mechanism for doing this forms no part of my present invention which concerns the carrying mechanism for the accumulator. This carrying mechanism in the patent above referred to includes a pin marked 162, one on each number disk, which, when said disk had been rotated to the point where it is to carry its value onto the disk of the next higher order, pressed upon a lever and set the carrying mechanism in such position as to enable it to be operated by the appropriate one of the pins 164 on a pin drum 165 operated by a hand lever. Instead of using these pins on the number wheels to set the carrying mechanisms ready for action, I employ a series of points or arms 66 which, instead of being located on the number disk which is of comparatively small diameter, I place on an intermediate gear 67 of larger diameter than the number disks, and these points project beyond the toothed periphery of the said intermediate gears. I prefer to form these points or arms on plates 68 suitably secured to the intermediate gears by pins 69, though I do not wish to limit myself to this way of forming or fastening the points in place. With the intermediate gears, pawls 70 coöperate, these being normally disengaged from the transmitting gears through which the carrying action is performed, as shown in Figs. 1 and 2. These pawls are carried by plates 71 loosely mounted on a pin 72 mounted in the accumulator frame plates. These plates or setting members for the carrying mechanisms have depending tail pieces 73 normally out of the path of movement of the said pins 164 on the pin drum 165, but arranged to be thrown into the path of their respective pins when the arms or points 66 on the carrying gears 67 strike the shoulders or lugs 74 on the setting plates or members.

It will be noticed that I employ three arms or points 66 on the carrying gears, these being located ten teeth apart so that one-third of a revolution of the carrying wheel represents one complete revolution of the number disk, and, as a carrying operation must be performed at each complete revolution of a number disk, the points or arms 66 are properly disposed on the carrying gears so as to accomplish this result. The carrying pawls 70 are mounted upon the setting plates 71 by pins and cam slots at 75, 76, and a cam slot at 77 engages the fixed pin 78 of the accumulator frame, this being fixed in the side plates of said frame. Each pawl is under tension of a spring 79 connected to its tail portion and to a cross bar 80 fixed in the accumulator frame plates.

As before stated, the pawls are normally disengaged from the carrying gears and likewise the setting plates have their tail portions normally out of line with their respective pins on the pin drum, as shown in full lines in Fig. 1. Now, supposing the unit number wheel is being turned step by step by the transmitting gear 3, the carrying gear 67 corresponding thereto and which meshes with the transmitting gear 3 will also be turned step by step, but its movement will be without effect until the number disk is about to complete one revolution, when the arm or point 66 on the said carrying gear will contact with the setting plate or member 71 corresponding thereto, and set the same with its tail in the path of movement of its pin 164 on the drum 165, as shown in dotted lines in Fig. 1, and, at the same time, the normally disengaged pawl 70 corresponding to the number wheel of the next higher order and which is connected with the setting plate just mentioned by the pins and slots, will be retracted into position to engage with its carrying gear, by the setting movement of the setting plates or member, and then when the pin drum is rotated in the direction of the arrow, the setting plate will be moved back to normal position, and, at the same time, its pawl will engage and turn the carrying gear so as to carry the units on to the tens number disk or wheel, and as soon as this is accomplished, the pawl will disengage itself from the carrying gear, this being due to the action of the cam slots and pins, and the spring, and this disengagement takes place at the proper moment so that there will be no danger of overthrow, the carrying gear being arrested in proper position by a detent 80, there being one for each carrying gear, these detents being pivoted to a cross pin or bar 81 of the frame and being under tension of spring, such as at 81$^x$.

A number of advantages accrue from the construction above described over the arrangement disclosed in the patent referred to, among which may be mentioned: By dispensing with the carrying pins on the number disk marked 162 in said patent, which required in addition to the space for the gears on the number disk the space necessary for the pins and levers 161 to work in, I am enabled to use number disks having wider peripheries without increasing the total width of the accumulator mechanism, and thus place numbers of larger size thereon and, consequently, more legible than was possible in the old arrangement. Again, by placing the setting arms or points 66 on the carrying gears instead of upon the number wheels, I can locate these points at a sufficient distance from the center about which they revolve to get a good clearance between the end of the point or arm and the shoulder or lug on the setting arm after striking and setting the same, so that, on the return movement of the setting member, it will not strike the point 66 and turn it, together with the carrying gear and number disk, backward to 9 when it should be turned to zero. Briefly stated, the present arrangement enables the point or arm 66 to have an arc of movement sufficiently long for the step movement of the carrying gear to make the point or arm perform its setting function on the setting plate 71, and then pass beyond the same a sufficient distance to insure a good clearance when the setting plate or member is moved back to normal position, and thus prevent the setting member or plate from striking the point 66 and turning the carrying gear back with it. The carrying pawls 70 are always disengaged excepting when actually operated.

As in the above mentioned patent, the pin drum is rotated through a clutch or pawl and ratchet mechanism indicated generally at 82, this being of substantially the same form as that illustrated in said patent and needs no particular description herein. The pin drum moves forward at each forward movement of the rock shaft 46, but the backward movement of the rock shaft is without effect on the pin drum. The slot at 75 of the dog 70 is in such shape as will hold the dog in engagement with the tooth of the carrying wheel until after the pin 164 has passed the tail piece 73.

*Means for returning number disks to zero.*—This mechanism includes a bar 98 extending across the peripheries of the intermediate or carrying gears 67 and carried by arms 99 pivoted to the accumulator frame at 100, so that said bar will describe an arc the radius of which is larger than and eccentric to the periphery of the carrying gears. The resetting bar is normally held to the rear out of the way of the points 66, a suitable spring being employed for this purpose, but when the bar is moved forwardly by the handle 98$^x$ and crank 99$^x$, Fig. 4, it will strike the points of all those number gear trains which are not in zero position, and will move them to such position.

Instead of the pawls and pawl carriers above described, I prefer to employ the arrangement shown in Figs. 5 to 8, in which slots and pins for controlling the pawls are slightly modified. The pawl itself is also modified, having no spring such as 79 connected therewith as in the form first described, but being controlled by a detent 102 suitably pivoted to the frame at 102$^x$, and having a pin 103 adapted to engage notches 104—105 in the pawl, said detent being under tension of a spring 106 which also applies tension to the detent 80 used in the first form of the device.

Figure 7:
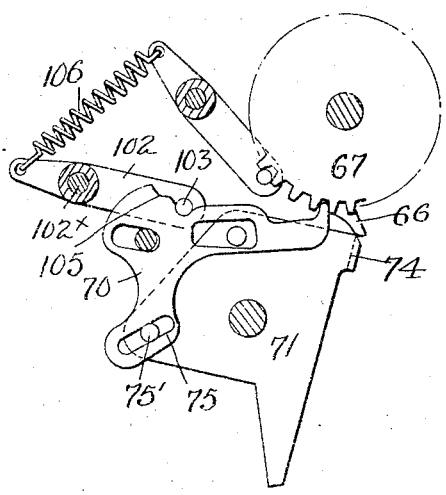
Figure 5:
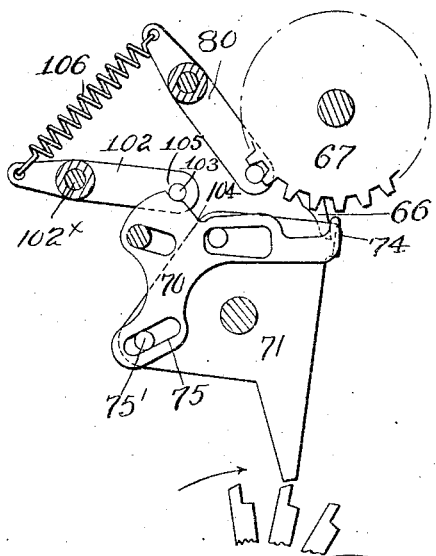
Figure 8:
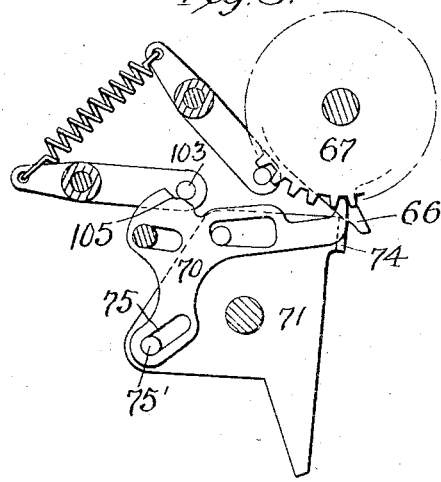
Figure 6:
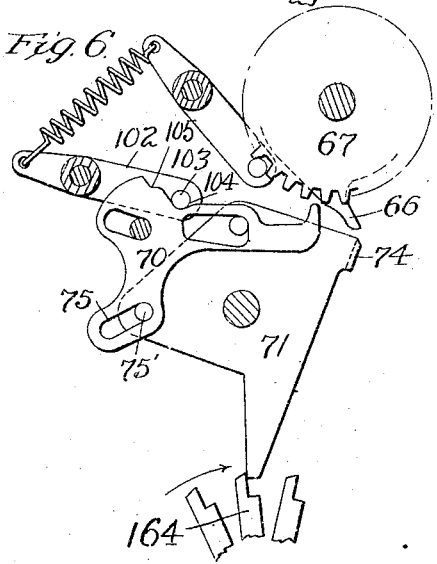
Figure 9:
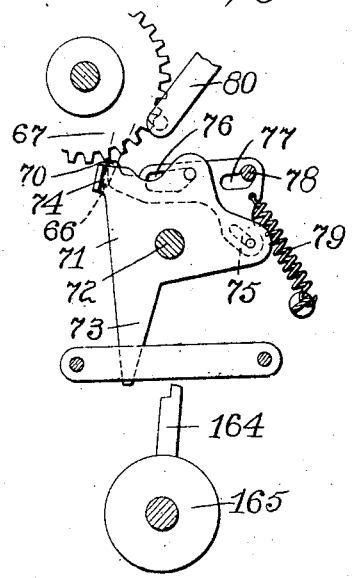
Figure 11:
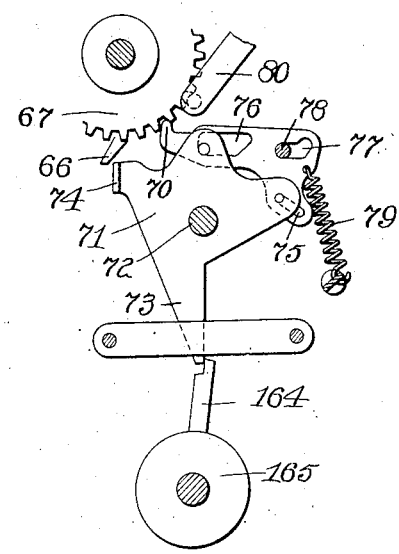
Figure 10:
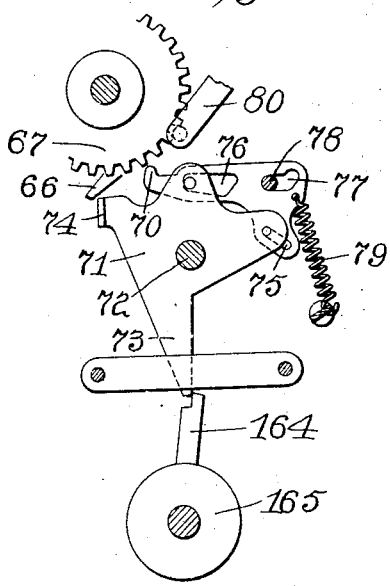
Figure 12:
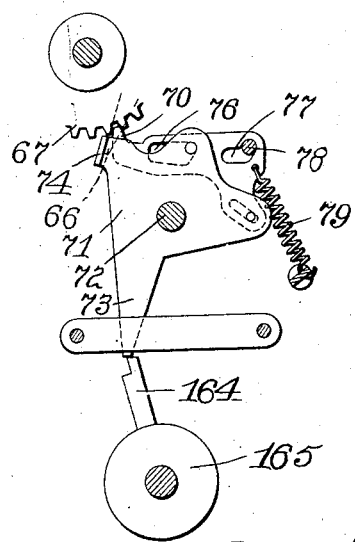

The action is as follows: Fig. 5 shows the normal position of the parts. As the number wheel changes from 9 to 0, the spider arm 66 strikes the lug 74 on the pawl carrier, moving it forward (to the right in the drawings). The pin 75' (rigid in the carrier) moving in the slot 75 in the pawl 70, carries the pawl back to the position of Fig. 6, (the set up position) where it is held by the detent 102 having the pin 103 to bear in either one or the other of the notches 104, 105 in the pawl 70. When the pin drum revolves, the pin 164 thereof strikes the tail of the pawl carrier 71 and moves the same, the pawl is at first held from forward movement by the resistance of the detent and its spring, so that turning on the detent pin 103 as a pivot, the pawl rises into engagement with the gear 67, as shown in Fig. 7. Further movement of the pawl carrier now causes the pawl to push the gear forward one tooth, the detent rising to the upper notch. At the extreme end of the motion of the carrier which is determined by the slots and pins, the relation of the slots is such that the pawl is held locked in the gear, preventing over-throw; (Fig. 8). When the pin drum passes and releases the tail of the carrier, the carrier drops back slightly, allowing the pawl to return to the normal position, this dropping back of the carrier with the pawl to normal position being due to gravity aided by the detent 102 under tension of its spring, for it will be noticed that in the position of the parts in Fig. 8, the pin 103 has not yet seated itself in the notch 105, so that when the pin of the pin drum releases the pawl carrier, the spring of the detent 102, exerting its force, will cause the detent pin 103 to press on the inclined wall of the notch, and thus return the pawl and pawl carrier to normal position of Fig. 5.

I claim:—

1. In combination registering wheels, carrying wheels, pawls for operating the carrying wheels, setting members carrying said pawls, a resetting bar extending transversely of and operating around the periphery of the carrying wheels and projections on the carriers extending out beyond the peripheries of said carrying wheels into the path of the resetting bar and into position to operate the resetting means said projections serving as operating means common to both the setting members and to the carrying wheels for resetting the latter, substantially as described.

2. In combination with the carrying wheels, the setting members to be operated thereby, the pawls slidably mounted on the setting members, and having a guiding connection therewith, detents engaging and controlling the action of the pawls, and means for returning the setting members to normal position to cause the pawls to engage and operate the carrying wheels, substantially as described.

3. In combination with the carrying wheels, means thereon for operating setting members, setting members to be operated by said means on the carrying wheels, the pawls slidably mounted on the setting members, and having pin and slot guiding connections therewith, detents with which the pawls have sliding engagement, and which detents act as pivots for the pawls whereby the pawls, normally disengaged from the carrying wheels, will be tilted into engagement with the carrying wheels in the first part of the movement of the setting members toward normal position, and means for returning the setting members to normal position to first tilt the pawls and then to advance them to turn the carrying wheels, substantially as described.

4. In combination the carrying wheels, pawls for turning the same, pivoted setting members carrying the pawls directly thereon and having pin and slot connection with the pawls, said pawls having also a pin and slot connection with the frame, which pawls are normally disengaged from the carrying wheels, means on the carrying wheels for directly engaging and moving the setting members forward to retract the pawls by the pin and slot connection, a detent for each pawl to engage either of two notches or inclines thereon, with springs for pressing the said detents, substantially as described.

5. In combination with carrying wheels, a pawl for each, means for operating the pawls, said pawls remaining in engagement with the carrying wheels to prevent over-throw after the pawls have been operated to their full limit, and spring pressed means for then disengaging the pawls from the carrying wheels, substantially as described.

6. In combination with carrying wheels, a pawl for each, means for operating the pawls, said pawls remaining in engagement with the carrying wheels to prevent over-throw after the pawls have been operated to their full limit, and means for then disengaging the pawls from the carrying wheels, said means consisting of the spring detents, substantially as described.

7. In combination the carrying wheels, pivoted setting members operated in one direction from the carrying wheels, means for returning the setting members to normal position, pawls on the setting members having pin and slot connections therewith, pin and slot connections between the pawls and the frame, the said pawls retracting as the setting members advance, and spring detents to engage notches in the pawls, and acting as pivots therefor when engaging one of said notches, substantially as described.

In testimony whereof I affix my signature in presence of two witnesses.

SYDNEY B. AUSTIN.

Witnesses:
ROWLAND TRIMBLE,
MALCOLM GRANT.

Copies of this patent may be obtained for five cents each, by addressing the "Commissioner of Patents, Washington, D. C."